US012104371B2

(12) United States Patent
Toyosawa et al.

(10) Patent No.: US 12,104,371 B2
(45) Date of Patent: Oct. 1, 2024

(54) SURFACE TREATMENT DEVICE AND SURFACE TREATMENT METHOD

(71) Applicant: TOYOKOH CO., LTD., Fuji (JP)

(72) Inventors: Kazuaki Toyosawa, Fuji (JP); Kazuomi Usuki, Fuji (JP); Yasuhiro Itoh, Fuji (JP)

(73) Assignee: TOYOKOH CO., LTD., Fuji (JP)

( * ) Notice: Subject to any disclaimer, the term of this patent is extended or adjusted under 35 U.S.C. 154(b) by 142 days.

(21) Appl. No.: 17/614,234

(22) PCT Filed: May 20, 2020

(86) PCT No.: PCT/JP2020/019861
§ 371 (c)(1),
(2) Date: Nov. 24, 2021

(87) PCT Pub. No.: WO2020/241396
PCT Pub. Date: Dec. 3, 2020

(65) Prior Publication Data
US 2022/0213681 A1 Jul. 7, 2022

(30) Foreign Application Priority Data
May 28, 2019 (JP) ................................ 2019-099304

(51) Int. Cl.
*B05D 1/02* (2006.01)
*B05D 1/36* (2006.01)
(Continued)

(52) U.S. Cl.
CPC .................. *E04B 1/76* (2013.01); *B05D 1/02* (2013.01); *B05D 1/36* (2013.01); *E04B 1/6815* (2013.01);
(Continued)

(58) Field of Classification Search
None
See application file for complete search history.

(56) References Cited

U.S. PATENT DOCUMENTS

2006/0005765 A1* 1/2006 Davidson .............. B05B 13/041 118/305
2016/0121486 A1* 5/2016 Lipinski .............. B05B 13/0405 427/427.3

FOREIGN PATENT DOCUMENTS

JP 53-37749 4/1978
JP 54-116561 8/1979
(Continued)

OTHER PUBLICATIONS

International Search Report for PCT/JP2020/019861 dated Jul. 21, 2020, 7 pages.
(Continued)

*Primary Examiner* — Michael P. Rodriguez
(74) *Attorney, Agent, or Firm* — NIXON & VANDERHYE

(57) ABSTRACT

To provide a surface treatment device having improved treatment quality of surface treatment using a foamable material, a surface treatment device includes, a moving body which can move along a surface of a processed object, a first spray device which is provided on the moving body and sprays a first material Sf having foamability on the surface of the processed object, and a second spray device which is provided on the moving body and sprays a second material Sc for covering the surface of the first material on a area of the surface of the processed object after spraying the first material from the first spray device and the first material is foamed.

20 Claims, 9 Drawing Sheets

(51) Int. Cl.
*E04B 1/68* (2006.01)
*E04B 1/76* (2006.01)
*E04F 21/08* (2006.01)
*E04B 1/74* (2006.01)

(52) U.S. Cl.
CPC ........ *E04F 21/08* (2013.01); *E04B 2001/742* (2013.01)

(56) References Cited

FOREIGN PATENT DOCUMENTS

| | | |
|---|---|---|
| JP | 10-34044 | 2/1998 |
| JP | 11-207221 | 8/1999 |
| JP | 3384735 B2 * | 3/2003 |
| JP | 2008-069563 | 3/2008 |
| JP | 2010-168878 | 8/2010 |
| JP | 2015-063807 | 4/2015 |
| JP | 2016-526121 | 9/2016 |
| WO | 2014/188221 | 11/2014 |

OTHER PUBLICATIONS

Written Opinion of the ISA for PCT/JP2020/019861 dated July 21, 2020, 4 pages.

* cited by examiner

【FIG. 4】

SURFACE TREATMENT DEVICE AND SURFACE TREATMENT METHOD

CROSS-REFERENCE TO RELATED APPLICATIONS

This application is the U.S. national phase of International Application No. PCT/JP2020/019861 filed May 20, 2020 which designated the U.S. and claims priority to Japanese Patent Application No. 2019-099304 filed May 28, 2019, the entire contents of each of which are hereby incorporated by reference.

BACKGROUND OF THE INVENTION

Field of the Invention

The present invention relates to a surface treatment (processing) device (apparatus) and a surface treatment (processing) method for applying a foam material and other materials covering the foam material onto a surface of a treatment (process) object such as a roof of a building.

Description of the Related Art

For example, in a metal folded-plate roof of a large building such as a factory, a warehouse, a commercial facility, etc., it is necessary to apply a coating at a predetermined time interval in order to protect the metal portion and to secure waterproofness, rust prevention, heat insulating property, etc.

In recent years, it has been proposed to spray a foamable resin material onto a roof to form a heat-insulating foam layer on the roof surface.

For example, Patent Document 1 describes that a heat-insulating foam layer made of a resin foaming agent is formed on a surface of a roof or the like by spraying, and a reinforcing waterproof layer made of a high-strength resin having a waterproof property etc. is formed on the surface of the heat-insulating foam layer by spraying.

Further, as a prior art relating to automation of a roof painting etc., for example, Patent Document 2 discloses a painting apparatus for a folded-plate roof formed by periodically bending a metal plate into concave-convex, on the apparatus a nozzle is mounted on a carriage which travels along a valley portion of a folded-plate roof.

PRIOR ART DOCUMENTS

Patent Documents

Patent document 1: JP 2010-168878A
Patent document 2: JP H 11-207221A

SUMMARY OF THE INVENTION

Conventionally, a surface treatment using a material having foaming properties as described in Patent Document 1 has been carried out in such a way that a worker holds a spray gun equipped with a nozzle and goes up on a roof.

In this case, a worker places a temporary scaffold on a roof, and the worker stands on the scaffold and sprays the foaming resin onto a predetermined area, then the worker moves the scaffold in order to perform the treatment of an adjacent area.

However, in this case, a boundary portion between the previously treated area and the later treated area may sometimes be doubly sprayed with the foamable resin, resulting in a locally increased thickness of the foam heat-insulating layer.

When the coating thickness of the foamable resin is locally increased as described above, a loss of the raw material is caused. Further, when such a portion is formed along a direction orthogonal to an inclination direction of the roof, rainwater flowing down from the upper portion of the roof is dammed up, which causes deterioration in drainage and waterproofness.

Besides, in the heat-insulating foam layer made of a foamable resin, the reactive groups on the surface of the resin layer decrease with time after spraying, and the surface deterioration due to ultraviolet rays progresses, and the adhesion strength with the coating agent decreases. Further, it is discolored by the influence of ultraviolet rays, and the surface becomes brittle, thereby deteriorating the physical properties of the foam. Therefore, it is preferable to apply the coat layer immediately (for example, within a few hours) after the foamable resin is sprayed and foamed, but by the above-described manual operation of the worker, it has been unavoidable that a certain length of time is required until the coating of the coat layer after the spray of the foamable resin.

On the other hand, it is conceivable to apply a heat-insulating foamed layer made of a foamable material using a self-propelling coating apparatus as described in the reference document 2, and further to form a reinforcing waterproof layer on the surface.

However, in this apparatus, it is not taken into consideration that plural kinds of liquid agents are sprayed by this coating apparatus. When an insulating foam layer and a reinforcing waterproof layer are respectively formed by two independent coating apparatuses, an operation process becomes extremely complicated, and it is inevitable that a long time is required until a reinforcing waterproof layer forming after a heat insulating foamed layer is formed.

In addition, as described in FIG. 5 of reference document 2, a nozzle is arranged so as to be directed toward a top surface of a mountain portion of a folded-plate roof. When a material having foaming properties is sprayed in this way, there is an anxiety that the heat insulating foam layer becomes locally thick at the top surface of the mountain portion, resulting in a so-called mushroom like bulging cross section, which wastes raw material and has an adverse effect on drainage of rainwater etc.

In view of the above problems, it is an object of the present invention to provide a surface processing apparatus and a surface processing method which improve the quality of a surface treatment using a material having foaming properties.

The present invention solves the above problems by the following solution means.

A surface processing apparatus comprises a moving body movable along the surface of a processed object, a first spray device provided on the moving body that sprays a first material having foaming properties on the surface of the processed object, and a second spray device provided on the moving body that sprays a second material for coating a surface of the first material on an area where the first material is already sprayed from the first spray device on the surface of the processed object.

According to this configuration, by spraying the first material and the second material while travelling the moving body along the surface of the process object, variation (unevenness) in the coating thickness of each material can be suppressed.

Further, by providing the first spray device and the second spray device on the same moving body, it is easy to apply the second material within a short time after the application of the first material, and the quality of the surface treatment can be improved.

In a further embodiment, the process object is a roof inclined with respect to a horizontal plane, and the surface processing apparatus is further characterized in that the first spray device and the second spray device perform a spray in a state in which the moving body moves along an inclination direction of the roof.

According to this configuration, by arranging the feeding direction of the moving body at the time of spraying the first material and the second material along the inclination direction of the roof, it is possible to prevent the formation of the unevenness extending in the direction orthogonal to the inclination direction (typically, the horizontal direction) and to secure the drainage property of rainwater etc.

Note that, in the present specification and claims, an inclination direction of a roof means a direction from a ridge side provided at an upper portion of a roof toward an eaves side provided at a lower portion of a roof (a drain direction such as rainwater), and includes a direction in which an inclination of a roof relative to a horizontal plane is maximized.

In another embodiment, the process object is a roof inclined with respect to a horizontal plane, the roof having mountain portions protruding upward and extending along one direction and valley portions which are concave portions sandwiched between the mountain portions alternately arranged in parallel, and the surface processing apparatus is further characterized in that the first spray device and the second spray device perform a spray in a state in which the moving body moves along a longitudinal direction of the mountain portion and the valley portion of the roof.

According to this configuration, by spraying the first material and the second material while travelling along the longitudinal direction of the mountain portions and the valley portions of the folded-plate roof, the above-described effect can be certainly obtained.

In yet another embodiment, the surface processing apparatus is further characterized in that the moving body has a rolling element which runs along the valley portion of the roof.

According to this configuration, by utilizing the valley portion of the folded-plate roof as a rail for guiding the movement of the moving body, it is possible to move the moving body with sufficient accuracy with a simple configuration.

In yet a further embodiment, the roof has an slope portion which is provided at a boundary portion between the mountain portion and the valley portion and which is inclined with respect to a projecting end surface of the mountain portion and a bottom surface of the valley portion respectively, the surface processing apparatus is further characterized in that a nozzle axis of at least one of the first spray device and the second spray device is arranged to be directed toward the slope portion.

According to this configuration, by spraying the first material and/or the second material toward the slope portion where it is difficult to secure a sufficient coating thickness, it is possible to secure a sufficient coating thickness on the slope portion and prevent an excessive increase in the coating thickness at the projecting end surface.

In a different embodiment, the surface processing apparatus 5 is further characterized in that at least one of the first spray device and the second spray device is arranged so that the nozzle axis is movable between a 1st state in which the nozzle axis is directed to the slope portion adjacent to one side of the valley portion and a 2nd state in which the nozzle axis is directed to the slope portion adjacent to the other side of the valley portion.

According to this configuration, it is possible to simplify the configuration of the apparatus by performing a spray onto the slope portions inclined in different directions by a common spray device while changing the state of the spray device.

In particular, it is possible to simplify the configuration of a compressor etc. which delivers a coating under pressure, and it is possible to reduce the equipment to be prepared on the ground, for example, when it is applied to a roof.

In a different embodiment, the surface processing apparatus is further characterized in that the moving body is movable along the surface in a direction different from a direction of movement of the body at a time when at least one of the first spray device and the second spray device performs a spray.

According to this configuration, after the first material and the second material are sprayed while travelling the moving body, the moving body is fed in a direction different from the travelling direction at that time, and the same processing is repeated, whereby a wide range of treatment can be performed easily and with high quality.

In yet a further embodiment, the surface processing apparatus is further characterized in that the apparatus comprises a rail portion contacting with the surface for guiding the moving body along the surface toward a direction different from the moving direction at the time when at least one of the first spray device and the second spray device sprays, and a moving body separating portion provided between the moving body and the rail portion for altering a space between the moving body and the rail portion toward a direction to which the moving body apart from the surface.

According to this configuration, it is possible to appropriately obtain the above-described effect with a lightweight and simple configuration.

In a further embodiment, the surface processing apparatus is further characterized in that the second spray device has a function of spraying the second material multiple times on an area where the first material has been sprayed by the first spray device. According to this, it is possible to apply, for example, a material having a waterproof property etc. to a sufficient coating thickness on the surface of the material having foaming property, and to further enhance the treatment quality.

In a different embodiment, the surface processing apparatus is further characterized in that a point of contact with the moving body on the surface, a directed point of the nozzle axis of the first spray device, and a directed point of the nozzle axis of the second spray device are separately arranged to each other and sequentially arranged in a direction different from a direction of movement of the moving body during a time when at least one of the first spray device and the second spray device performs spraying.

According to this configuration, the first spray device and second spray device spray onto a different mountain portion or a valley portion in the same travelling stroke of the moving body, so that the second material can be sprayed at an appropriate time interval after the first material has been sprayed.

In another embodiment, the surface processing apparatus is further characterized in that the moving body contacts the surface at only one direction side in a direction orthogonal to a moving direction of the moving body at the time when the spray is performed toward an area to which the first spray device and the second spray device spray the first material and the second material onto the surface.

According to this configuration, by sequentially feeding the moving body in a direction away from the already sprayed area, it is possible to prevent the moving body from travelling on the surface of the area in which the foamable material is sprayed, and to protect the already treated surface and further enhance the treatment quality.

A surface processing method is characterized in that a first material having foaming property is sprayed onto a surface of a processed object using a first spray device provided on a moving body movable along the surface of the processed object in a state in which the moving body is being moved, and a second material, for coating an area after the first material is sprayed on the surface of the object, is sprayed using a second spray device provided on a moving body in a state in which the moving body is being moved.

In another embodiment, the process object is a roof inclined with respect to a horizontal plane, and the surface processing method is further characterized in that the first spray device and the second spray device perform a spray in a state where the moving body moves along the inclination direction of the roof.

In yet another embodiment, the process object is a roof inclined with respect to a horizontal plane, the roof having mountain portions protruding upward and extending along one direction and valley portions which are concave portions sandwiched between the mountain portions alternately arranged in parallel, and the surface processing method is further characterized in that the first spray device and the second spray device perform a spray in a state in which the moving body moves along the longitudinal direction of the mountain portion and the valley portion of the roof.

In a further embodiment, the surface treatment method is further characterized in that the moving body has a rolling element which runs along the valley portion of the roof. In yet a further embodiment, the roof has an slope portion which is provided at a boundary portion between the mountain portion and the valley portion and which is inclined with respect to a projecting end surface of the mountain portion and a bottom surface of the valley portion respectively, the surface processing method is further characterized in that a nozzle axis of at least one of the first spray device and the second spray device is arranged to be directed toward the slope portion.

In yet a further development, the surface processing method is further characterized in that at least one of said first spray device and said second spray device is arranged so that the nozzle axis is changed between a 1st state in which the nozzle axis is directed to the slope portion adjacent to one side of the valley portion and a 2nd state in which the nozzle axis is directed to the slope portion adjacent to the other side of the valley portion, and spray is respectively performed at the time of the 1st state and the 2nd state in a state in which the moving body is being moved.

In yet a further development, the surface processing method is further characterized in that at least one of the first spray device and the second spray device performs a spray while the moving body moves along a first direction, and at the end portion of the first movement direction the moving body is moved in a second direction different from the first movement direction.

In another embodiment, the surface processing method is further characterized in that, providing a rail portion for moving the moving body in contact with and along the surface, and in a direction different from the moving direction during a time when at least one of the first spray device and the second spray device sprays, and the moving body is moved in a direction along the rail portion in a state in which a distance between the moving body and the rail portion is altered to a direction in which the moving body apart from the surface.

In yet another embodiment, the surface processing method is further characterized in that, the second spray device sprays the second material multiple times onto the area where the first material is sprayed by the first spray device.

In a different embodiment, the surface processing method is further characterized in that a point of contact with the moving body on the surface, a directed point of the nozzle axis of the first spray device, and a directed point of the nozzle axis of the second spray device are separately arranged to each other and sequentially arranged in a direction different from a direction of movement of the moving body during a time when at least one of the first spray device and the second spray device performs spraying.

In yet another embodiment, the surface processing method is further characterized in that the moving body contacts the surface at only one direction side in a direction orthogonal to a moving direction of the moving body at the time when the spray is performed toward an area to which the first spray device and the second spray device spray the first material and the second material onto the surface, and spraying of the first material and the second material is performed while moving the moving body sequentially to the one direction side.

As described above, according to the present invention, it is possible to provide a surface processing apparatus and a surface processing method which improve the quality of the surface treatment using a material having foaming property.

DESCRIPTION OF THE PREFERRED EMBODIMENTS

A First Embodiment

Hereinafter, a surface processing apparatus and a surface processing method according to a first embodiment of the present invention will be described.

The surface processing method and the surface processing method according to the first embodiment are for forming a heat insulating foamed layer (foam layer) made of a resin material having foaming property and a reinforcing waterproof layer (coating layer) to be overcoated on the heat insulating layer and having waterproofness on a metal folded-plate roof of a large building such as a factory, a warehouse, a commercial facility, etc. and the roof formed by bending a metal plate such as a steel plate at a predetermined pitch.

Figure 1:
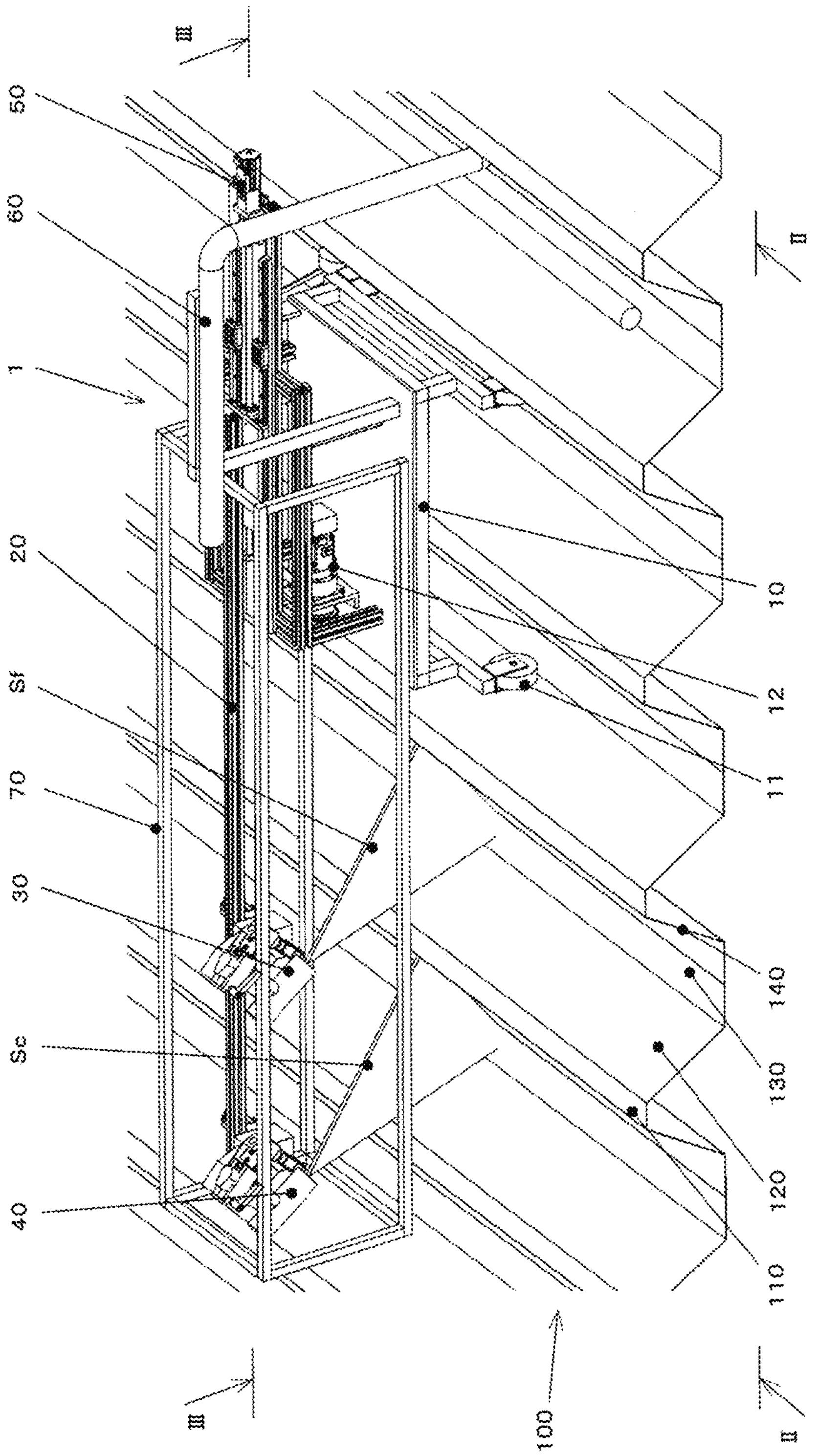
FIG. 1 An external perspective view of a surface processing apparatus according to the first embodiment of the present invention.

FIG. 1 is an external perspective view of the surface processing apparatus according to the first embodiment.

Figure 2:
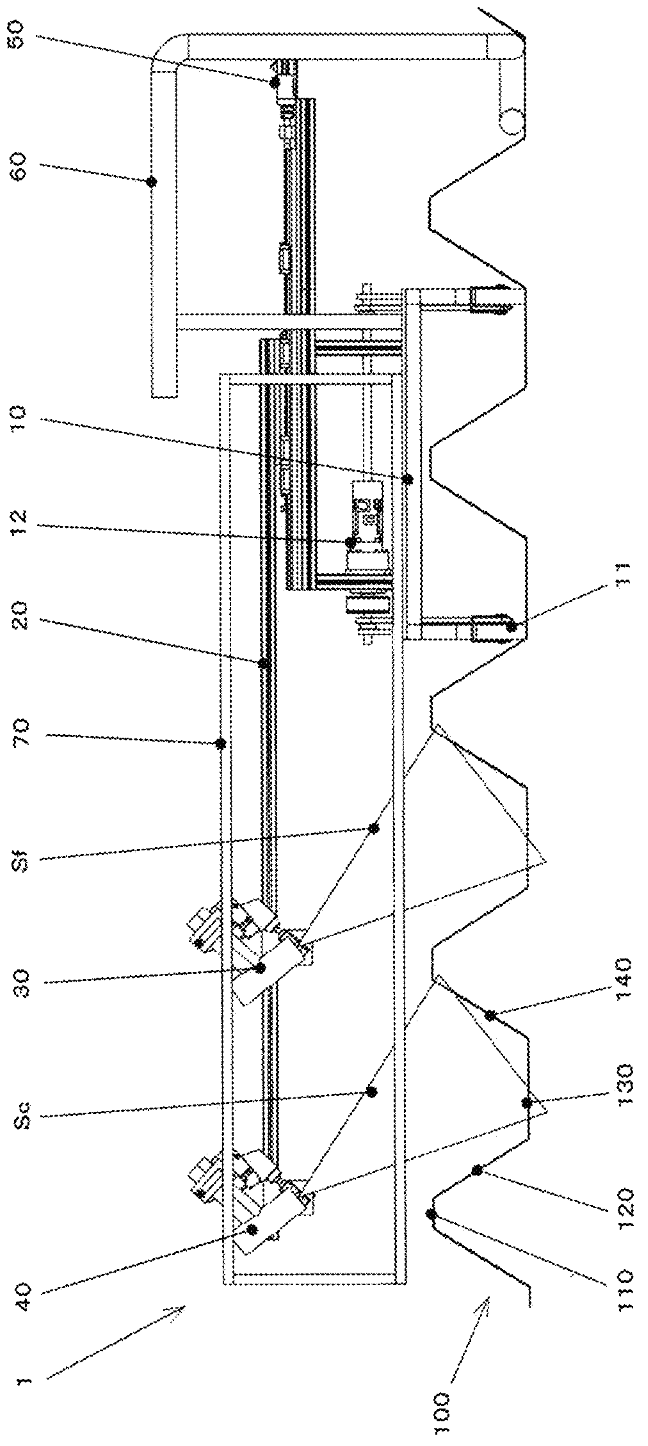
FIG. 2 A view taken along arrow line II-II of FIG. 1.

FIG. 2 is a view taken along arrow line II-II of FIG. 1.

Figure 3:
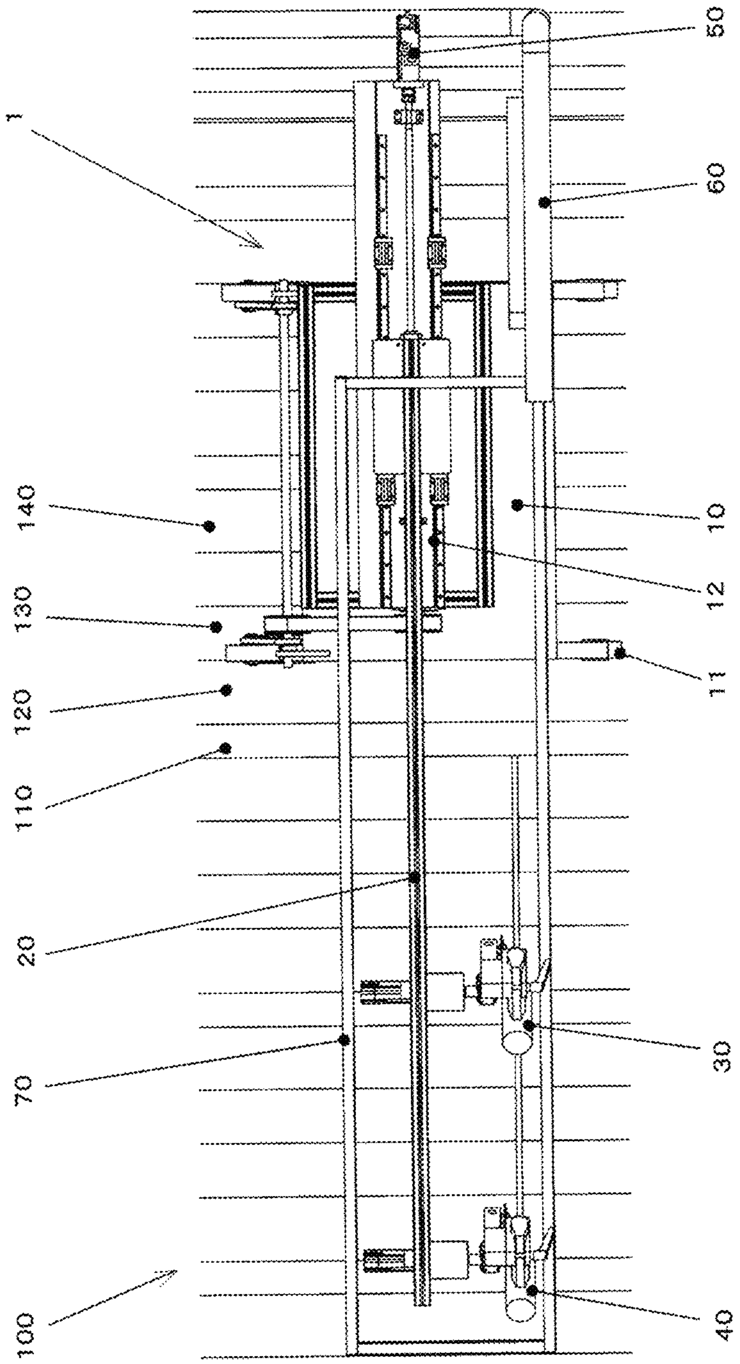
FIG. 3 A view taken along arrow line III-III of FIG. 1.

FIG. 3 is a view taken along arrow line III-III of FIG. 1.

The surface processing apparatus 1 according to the first embodiment includes a carriage 10, a nozzle stay 20, a foaming agent spray device 30, a coating agent spray device 40, a nozzle driving device 50, a duct 60, and a cover frame 70 etc.

A roof 100 of a process object is a folded-plate roof constituted by sequentially arranging a top surface 110, a 1st slope 120, a bottom surface 130, and a 2nd slope 140 which extend along a direction (vertical direction) in which the inclination is maximized.

In the following description, a convex portion formed by a top surface 110 and an upper half portion of the 1st slope 120 and the 2nd slope 140 adjacent thereto will be referred to as a mountain portion, and, a bottom surface 130 and a lower half portion of a 1st slope 120 and the 2nd slope 140 adjacent thereto will be referred to as a valley portion.

The carriage 10 is a base portion of the surface processing apparatus 1 and has a function of self-propelling on the roof 100 along the longitudinal direction of the mountain portion and the valley portion of the folded-plate roof.

As shown in FIG. 1 and FIG. 3, the main body of the carriage 10 has a rectangular board-like shape as viewed from the normal direction of the main plane of the roof 100. The carriage 10 has wheels 11 and a driving motor unit 12.

Each wheel 11 is a rolling element which is attached to a stay projecting downward from the carriage 10 and which rolls along the surface of the roof 100.

The wheels 11 are provided at 4 corners of the carriage 10, and their running directions are arranged along the longitudinal direction of the bottom surface 130 of the roof 100.

A pair of wheels 11 is provided in the vicinity of theist slope 120 side end of the bottom surface 130 of the roof 100 valley, and the other pair of wheels 11 is provided in the vicinity of the 2nd slope 140 side end of the bottom surface 130 at adjacent another valley.

With this configuration, the carriage 10 can travel being guided by the valley of the folded-plate roof as a rail.

The driving motor unit 12 is an actuator that transmits a driving force to the wheels 11. The drive motor unit 12 has an automatic stop function which automatically stops when the carriage 10 reaches an end of the roof 100.

The foaming agent spray device 30 and the coating agent spray device 40 have a function to stop the spray in response to an automatic stop of the driving motor unit 12.

The nozzle stay 20 is a cantilevered member which protrudes from the body of the carriage 10 and overhangs over the roof 100.

The nozzle stay 20 extends from the carriage 10 in a direction substantially orthogonal to the longitudinal direction of the mountain portion and the valley portion of the folded-plate roof (the travelling direction of the carriage 10 at the time of coating).

The nozzle stay 20 is a member to which the foaming agent spray device 30 and the coating agent spray device 40 are attached.

The nozzle stay 20 is supported on the carriage 10 so as to be relatively displaceable along the longitudinal direction thereof.

The foaming agent spray device 30 sprays a foaming resin material (first material) on a surface of a roof 100 as a spray Sf to form a heat-insulating foam layer.

As the material (foaming agent and foam agent), for example, a resin foaming agent such as a polyurethane resin, a phenol resin, or a mixture thereof can be used.

For example, a resin mainly containing a polyol, a polypropylene glycol (PPG) may be used as a main agent.

It is also possible to use, as a main agent, a phenolic resin or a phenolic resin containing a novolac thermoplastic resin as a main component, or a mixture thereof.

A crosslinking agent such as isocyanate is mixed with these main agents at a mixing ratio of about 1:1 to foam them, and a filler, an additive etc. is added to obtain a material for spray.

The isocyanate is a kind of non-fluorocarbon foaming agent, and has a function of generating carbon dioxide gas by reaction with water and foaming the material.

As soon as this material has been sprayed onto the surface of the roof 100, it begins to foam and an insulating foam layer is formed immediately, for example, on the order of several tens of seconds.

The coating agent spray device 40 sprays a resin material (a second material) constituting a reinforcing waterproof layer as a spray Sc on an area where an insulating foam layer is formed on the surface of a roof 100.

As the main agent of this material (coating agent), for example, a polyurethane resin containing polyol or polypropylene glycol (PPG) as a main component can be used.

A crosslinking agent such as isocyanate is mixed with the main agent at a mixing ratio of about 1:1, and a filler, an additive etc. is added thereto to obtain a coating agent.

The foaming agent spray device 30 and the coating agent spray device 40 are attached to the nozzle stay 20 in a posture in which the nozzle faces the roof 100.

The foaming agent spray device 30 and the coating agent spray device 40 are sequentially installed from the carriage 10 side.

A distance between the foaming agent spray device 30 and the coating agent spray device 40 at a lateral direction of the roof (a direction orthogonal to a longitudinal direction of the mountain portion and the valley portion) is set substantially equal to an interval of each top surface 110 of adjacent mountain portions on the roof 100.

Details of arrangement of the nozzle axis of each of the spray devices, such as an orientation of direction and the transition thereof, will be described in detail later.

The foaming agent spray device 30 and the coating agent spray device 40 have a function of switching between a 1st state in which the nozzle axis of the foaming agent spray device 30 and the coating agent spray device 40 is directed toward the 1st slope 120 of the roof 100 and a 2nd state in which the nozzle axial is directed toward the 2nd slope 140 by swinging (oscillating) the nozzle portion.

The nozzle drive device 50 moves the nozzle stay 20 relative to the carriage 10 along the longitudinal direction thereof, and adjusts the positions of the respective spray devices so that the nozzle axial center is at an appropriate position when the foaming agent spray device 30 and the coating agent spray device 40 switch between the 1st state and the 2nd state.

The nozzle driving device 50 drives the nozzle stay 20 in a direction of sending the stay 20 forward relative to the carriage 10 linking with a change of the foaming agent spray device 30 and the coating agent spray device 40 from the 1st state to the 2nd state, and drives the nozzle stay 20 in a direction of drawing back from a carriage 10 linking with a change from the 2nd state to the 1st state.

Figure 4:
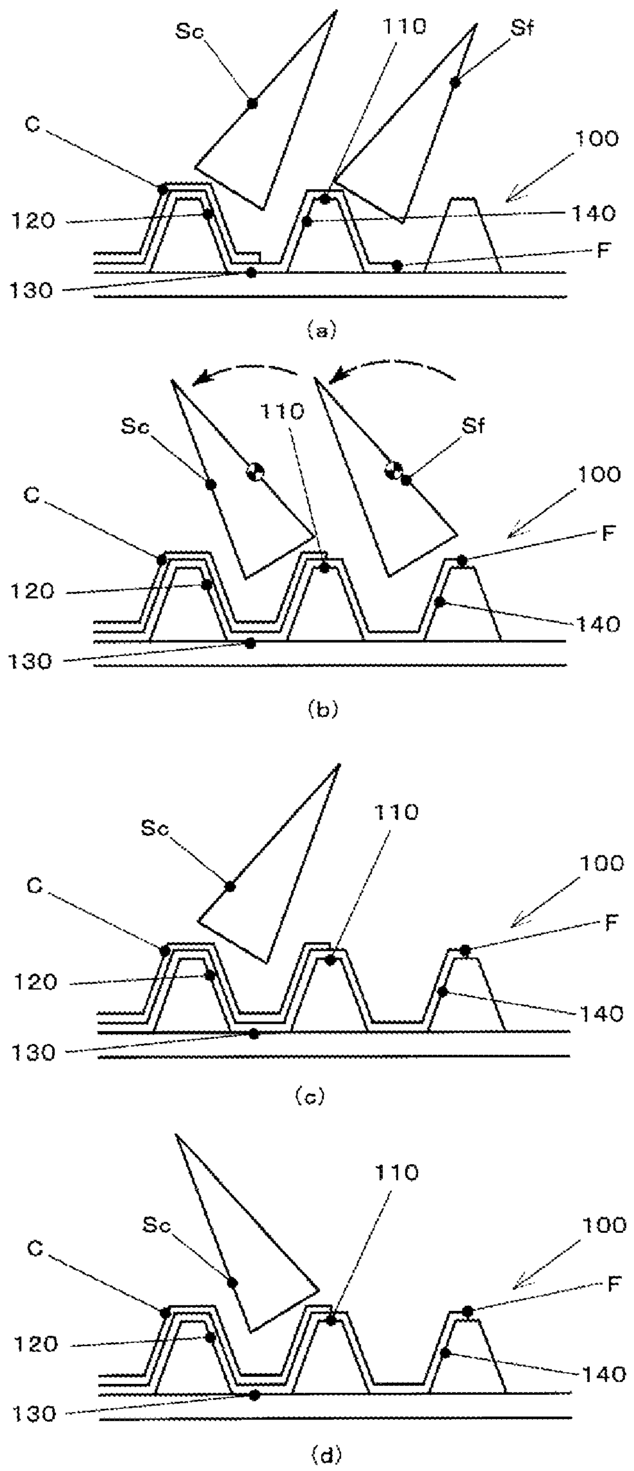
FIG. 4 Diagrams schematically showing a surface processing method onto a folded plate roof by a surface processing apparatus according to the first embodiment.

With such a function, the foaming agent spray device 30 and the coating agent spray device 40 can perform a behavior as shown in FIG. 4.

The duct 60 is a conduit for supplying the foaming agent and the coating agent which are pressurized and delivered from a material supplying means (not shown), which is provided on the ground for example, to the foaming agent spray device 30 and the coating agent spray device 40.

For example, the duct 60 is formed in a bendable flexible tubular shape and is interposed in an area opposite to the nozzle stay 20 protruding side with regard to the main body portion 10.

The cover frame 70 is a structure to which a cover member (not shown) is attached, and the member covers the foaming agent spray device 30 and the coating agent spray device 40.

The cover frame 70 is formed into a frame shape in which a plane shape seen from a running direction of the wheel 11 of a carriage 10 and viewed from a direction orthogonal thereto is a rectangular shape, respectively.

The cover frame 70 is, when viewed from the travelling direction of the carriage 10, arranged so as to protrude from the carriage 10 to each spray device side in a cantilever state.

Hereinafter, a surface processing method using the surface processing apparatus of the first embodiment will be described.

FIG. 4 is a diagram schematically showing a surface processing method onto a folded-plate roof by using the surface processing apparatus of the first embodiment.

Figure 5:
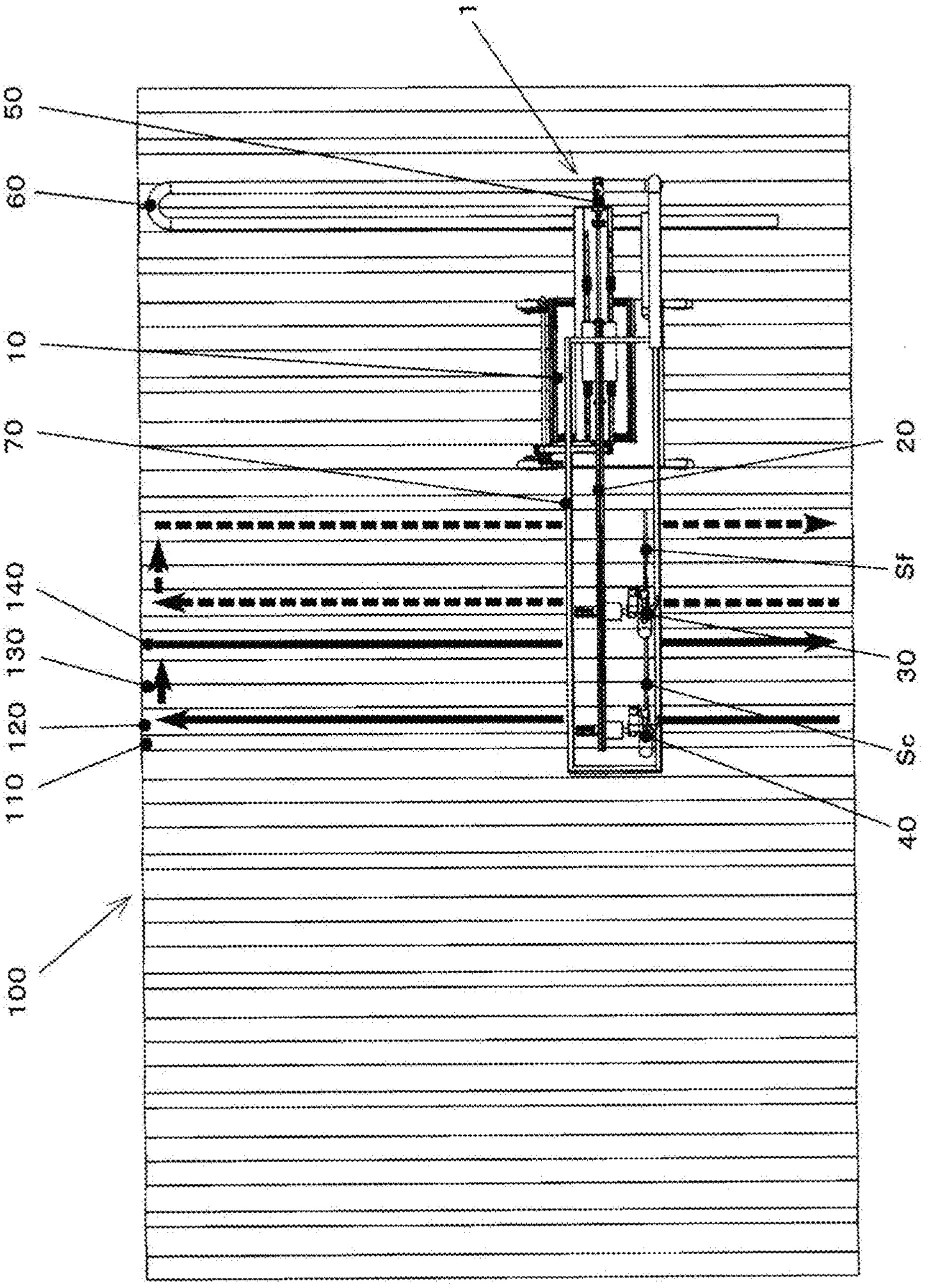
FIG. 5 A diagram schematically showing a path of a spray part of a surface processing apparatus according to the first embodiment.

FIG. 5 is a diagram schematically showing a path of a spray point in the surface processing apparatus according to the first embodiment.

In FIG. 4, FIGS. 4 (*a*) to 4 (*d*) show a spray state of each spray device in time series. Each nozzle part of the foaming agent spray device 30 and the coating agent spray device 40 is provided so as to be changeable between the 1st state and 2nd state, in the 1st state a spray Sf comprising a foaming agent and a spray Sc comprising a coating agent are directed to a 2nd slope 140 on the opposite side of the carriage 10 side with regard to a top surface 110, and in the 2nd state the sprays are directed to a 1st slope 120 on the carriage 10 side with regard to a top surface 110.

For example, the nozzle portion of the foaming agent spray device 30 and the nozzle portion 40 of the coating agent spray device can rotate (swing) relative to the nozzle stay 20 around the rotation shaft arranged along the travelling direction of the carriage 10.

Further, the nozzle driving device 50 has a function of adjusting the axial center direction of each nozzle to be appropriately directed to a predetermined slope in accordance with the rotation of each nozzle by moving the nozzle stay 20 along the longitudinal direction.

First, as shown in FIG. 4 (*a*), a nozzle axis of the foaming agent spray device 30 is directed toward the 1st slope 120, and a nozzle axis of the coating agent spray device 40 is directed toward a 1st slope 120 of another adjacent valley portion.

In this state, spray Sf is sprayed from foaming agent spray device 30, and spray Sc is sprayed from coating agent spray device 40, whereby the foaming agent and the coating agent can be respectively sprayed onto the 1st slope 120 to which each nozzle is directed and adjacent top surface 110 and bottom surface 130.

In this state, as shown in FIG. 5, the carriage 10 is travelled in one direction of the roof 100 (e.g., in an upward direction in FIG. 5).

Next, when the carriage 10 reaches an end of the roof 100, the carriage 10 is stopped, and the spray of the foaming agent spray device 30 and the coating agent spray device 40 is stopped. Then in this state, the nozzle direction of the foaming agent spray device 30 and the coating agent spray device 40 is changed, a nozzle stay 20 is fed out by the nozzle driving device 50, and the nozzle axial center is directed to the 2nd slope 140.

In this state, as shown in FIG. 4 (*b*), spray Sf is sprayed from the foaming agent spray device 30, and spray Sc is sprayed from the coating agent spray device 40, whereby the foaming agent and the coating agent can be respectively sprayed onto the 2nd slope 120 and adjacent top surface 110 and bottom surface 130.

In this state, as shown in FIG. 5, the carriage 10 is travelled to another direction of the roof 100 (e.g., in the downward direction in FIG. 5).

Through the processing described above, a foaming agent can be sprayed on the 1st slope 120 and the 2nd slope 140 which sandwiches the valley portion below the foaming agent spray device 30, and on the top surface 110 and the bottom surface 130 adjacent thereto.

The foaming agent foams shortly after spray (e.g., tens of seconds) and cures to form an insulating foam layer F.

Further, a coating agent can be sprayed on the 1st slope 120 and the 2nd slope 140 which sandwiches the valley portion below the coating agent spray device 40, and on the top surface 110 and the bottom surface 130 adjacent thereto.

The coating agent may be sprayed after the foaming agent is sprayed and before the foaming agent foams, but is preferably sprayed after the foaming agent has foamed. Since the coating agent is sprayed onto the surface of the already formed insulating foam layer, it is preferable that the coating agent is sprayed multiple times, accordingly, as described below, spraying of the coating agent only is to be performed.

In a state in FIG. 4 (*b*), a carriage 10 is travelled while spraying is performed, and when it reaches an end of a roof 100, a carriage 10 is stopped, and a foaming agent spray device 30 and a coating agent spray device 40 are stopped. Then in this state, a nozzle direction of a foaming agent spray device 30 and a coating agent spray device 40 is changed, and the nozzle stay 20 is drawn in by a nozzle driving device 50, and a nozzle axial center is directed toward the 1st slope 120.

In this state, as shown in FIG. 4 (*c*), only the coating agent spray device 40 sprays, and the carriage 10 is travelled upward in FIG. 5.

After that, after the carriage 10 reaches the upper end of the roof 100 in FIG. 5, the carriage 10 is stopped and the spray of the coating agent spray device 40 is stopped. Then in this state, a nozzle direction of a foaming agent spray device 30 and a coating agent spray device 40 is changed, a nozzle stay 20 is fed out by a nozzle driving device 50, and a nozzle axial center is directed to the 2nd slope 140.

In this state, as shown in FIG. 4 (*d*), only the coating agent spray device 40 performs spraying, and the carriage 10 is travelled downward in FIG. 5.

By repeating the spraying using only the coating agent spray device 40, it is possible to superpose the coating agent spraying a predetermined number of times and to obtain a desired thickness of the reinforcing waterproof layer (coating layer) C.

After the coating agent is sprayed to overcoat by a predetermined number of times (e.g., about 2 to 4 times) as described above, the surface processing apparatus 1 is moved, by workers or external equipment such as a crane, as though the carriage 10 straddles beyond one peak of a mountain portion of the roof 100, toward the carriage 10 side (right-hand side in FIG. 5 etc.) seen from the foaming agent spray device 30 side and coating agent spray device 40 side.

Thereafter, by sequentially repeating the processes of FIG. 4 (*a*) and thereafter, the heat-insulating foam layer and the reinforcing waterproof layer can be quickly applied on the surface of the folded-plate roof 100 with good quality.

According to the first embodiment described above, the following effects can be obtained.

(1) By spraying the foaming agent and the coating agent while moving the carriage 10 along the surface of the roof 100, it is possible to suppress variation (unevenness) in the coating thickness of the foaming agent and the coating agent and to uniformize the thickness of the heat-insulating foam layer and the reinforcing waterproof layer.

Further, by providing the foaming agent spray device 30 and the coating agent spray device 40 on the common carriage 10, it is easy to apply the coating agent within a short time after the application of the foaming agent, and the quality of the surface treatment can be improved.

(2) By arranging the travelling direction of the carriage 10 at the time of spraying the foaming agent and the coating agent along the vertical direction (maximum inclination direction) of the roof 100, it is possible to prevent the formation of unevenness extending in a direction orthogonal to the vertical direction and to secure the drainage property of rainwater etc.

(3) By spraying the foaming agent and the coating agent while the carriage 10 travels along the longitudinal direction of the mountain portion and the valley portion of the roof 100, the above-described effect can be reliably obtained.

(4) By utilizing the valley portion of the folded-plate roof as a rail for guiding the wheels 11 of the carriage 10, the carriage 10 can travel with sufficient accuracy by a simple configuration.

(5) By spraying the foaming agent and the coating agent toward the 1st slope portion 120 and the 2nd slope portion 140 where it is difficult to secure a sufficient coating thickness, it is possible to secure a sufficient coating thickness in the 1st slope portion 120 and the 2nd slope portion 140, and it is possible to prevent the coating thickness of the top surface 110 from becoming excessively large like a mushroom shape.

(6) It is possible to simplify the configuration of the apparatus by performing a spray onto the 1st slope 120 and the 2nd slope 140 which are inclined in different directions by a common spray device while changing the states of the foaming agent spray device 30 and the coating agent spray device 40.

In particular, it is possible to simplify the configuration of a compressor etc. for supplying the coating under pressure, and it is possible to reduce the number of equipment to be prepared on the ground when coating is applied to a roof.

(7) After the foaming agent and the coating agent are sprayed along the mountain portion and the valley portion of the folded-plate roof while the carriage 10 travels, the carriage 10 is fed to direction straddling beyond a mountain portion and a valley portion of the roof 100, and the same process is repeated, whereby a wide range of treatment can be performed easily and with high quality.

(8) By performing a process of spraying only a coating agent without spraying a foaming agent, it is possible to apply the reinforcing waterproof layer onto the surface of the heat-insulating foam layer until a sufficient coating thickness is obtained, and thus it is possible to further enhance the treatment quality.

(9) In the same travel stroke of the carriage 10, the foaming agent spray device 30 and the coating agent spray device 40 spray onto different peaks or valleys, whereby the coating agent can be sprayed at an appropriate time interval after the spraying of the foaming agent.

(10) The nozzle stay 20 supporting each of the spray devices is cantilevered from the carriage 10, and the carriage 10 is sequentially fed in a direction away from the sprayed area. Accordingly, it is possible to prevent the wheels 11 of the carriage 10 from running on the surface of the area where the heat-insulating foam layer has been formed, and to protect the heat-insulating foam layer thus further improving the treatment quality.

A Second Embodiment

Next, a second embodiment of the surface processing apparatus to which the present invention is applied will be described.

In each of the embodiments described below, portions common to the previous embodiment will be denoted by the same reference numerals, and description thereof will be omitted, and mainly differences will be described.

Figure 6:
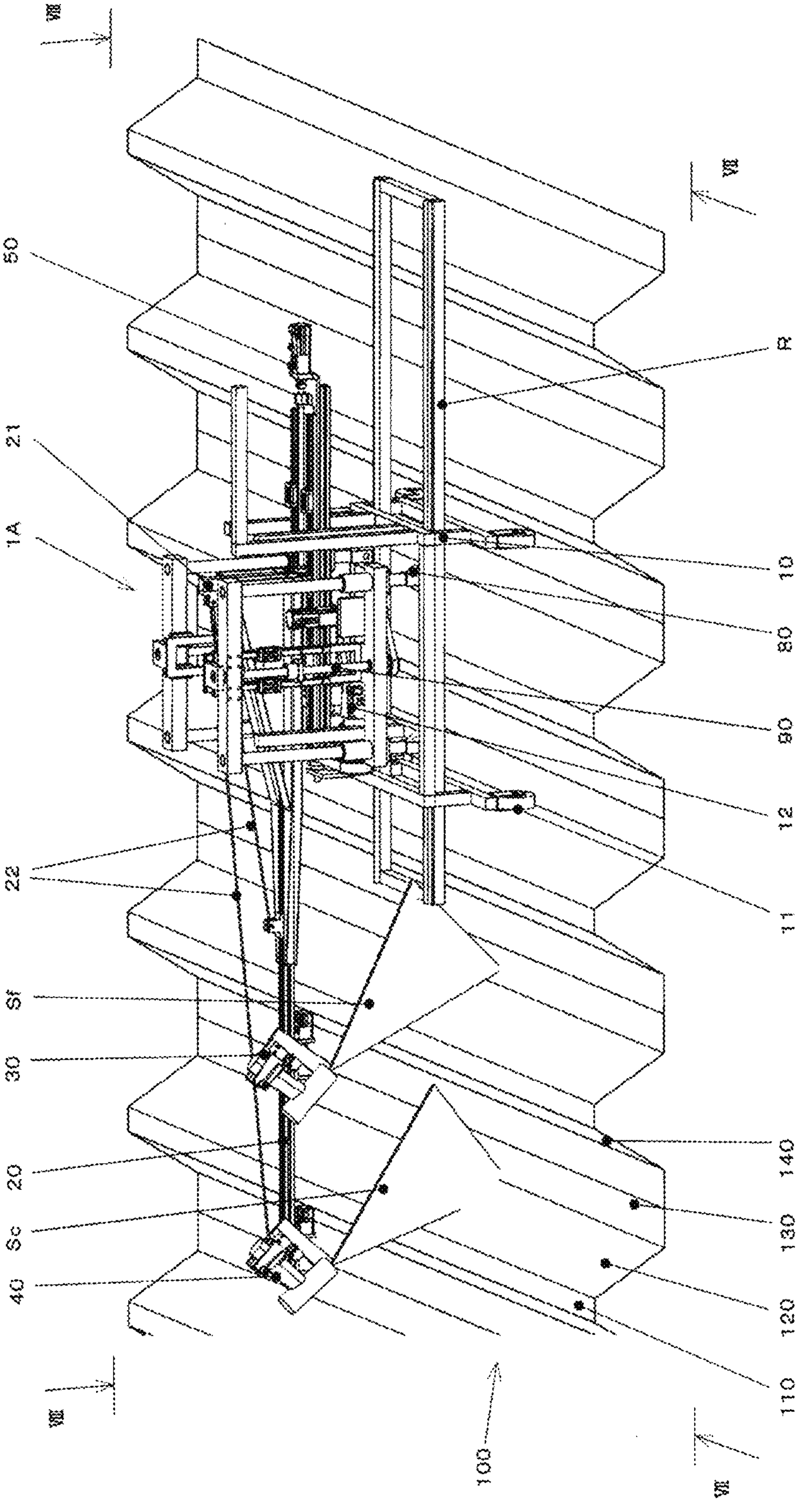
FIG. 6 An external perspective view of a surface processing apparatus according to the second embodiment of the present invention.

FIG. 6 is an external perspective view of the surface processing apparatus according to the 2nd embodiment.

Figure 7:
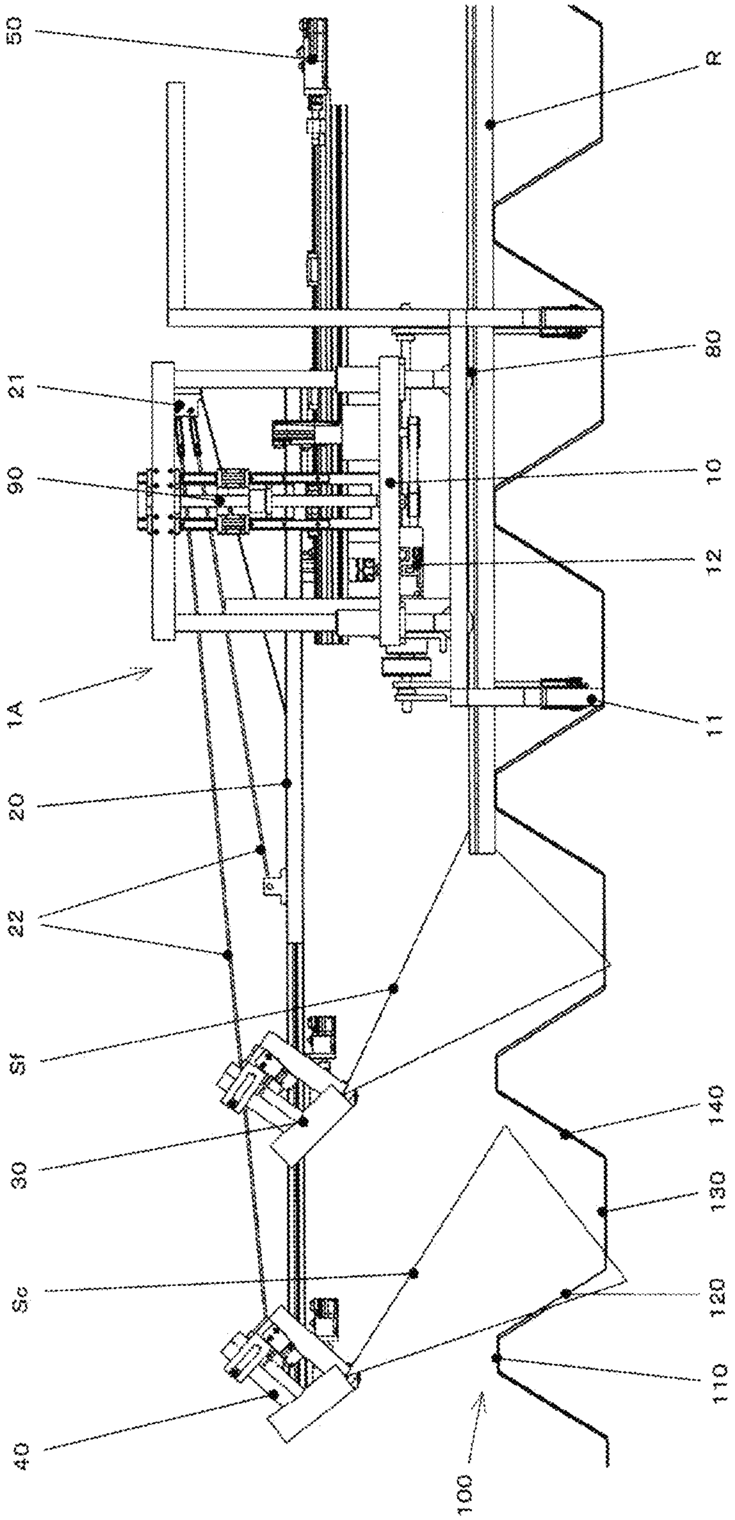
FIG. 7 A view taken along arrow line VII-VII of FIG. 6.
Figure 8:
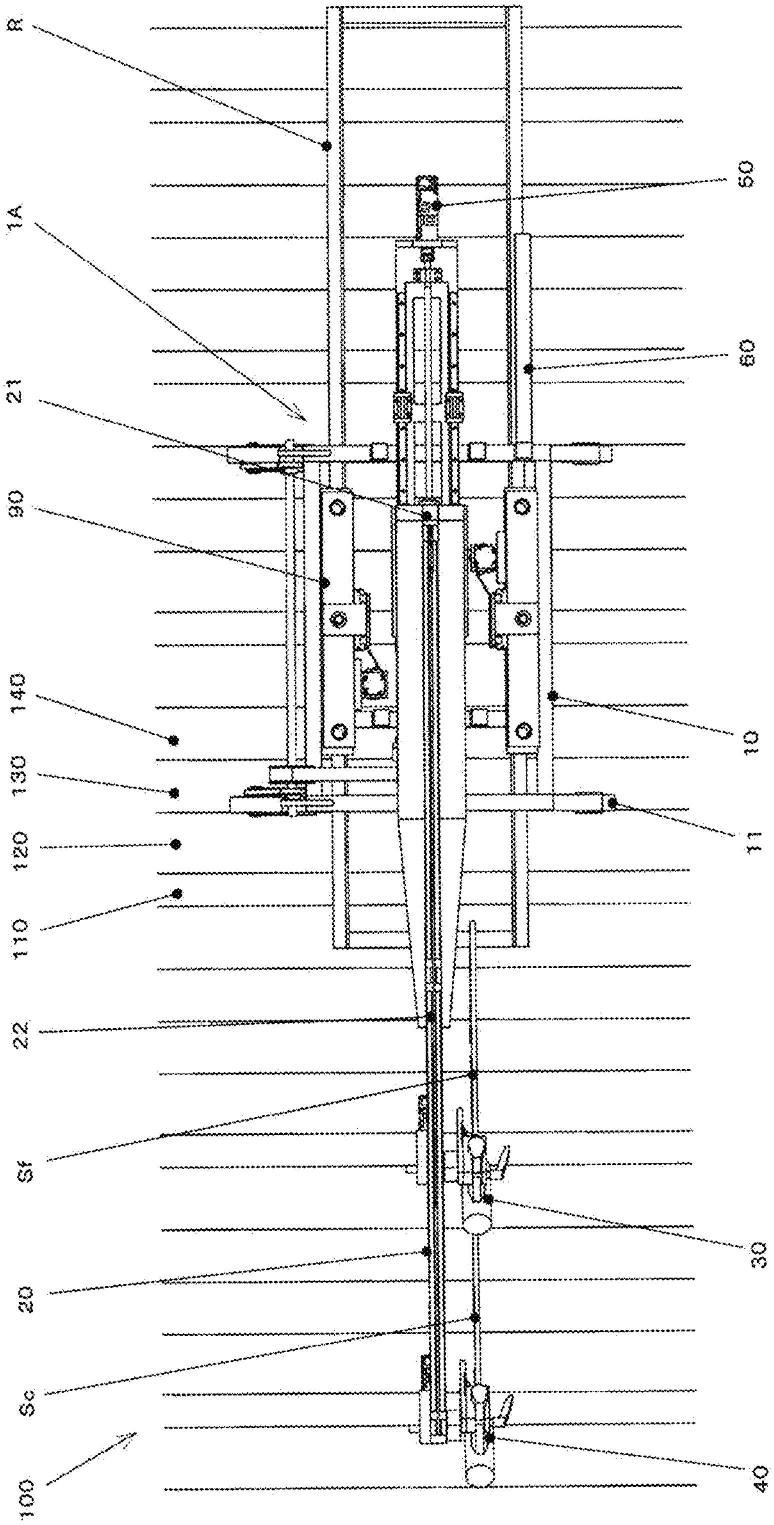
FIG. 8 A view taken along arrow line VIII-VIII of FIG. 6.

FIG. 7 is a view taken along arrow line VII-VII of FIG. 6;

FIG. 8 is a view taken along arrow line VIII-VIII of FIG. 6;

As shown in FIGS. 6 to 8, the surface processing apparatus 1A according to the second embodiment of the present invention is provided with a lateral travelling wheels 80, a jack 90, and a rail R added to the surface processing apparatus 1 of the first embodiment.

In FIGS. 6 to 9, the duct 60 and the cover frame 70 are omitted.

In addition, in the second embodiment, a tension wire 22 is provided between the bracket 21 protruding upward from the base of the nozzle stay 20 and the nozzle stay 20 to reinforce the support strength of the nozzle stay 20.

The lateral feeding wheel 80, the jack 90, and the rail R are used when the surface processing apparatus 1A is moved in the direction to which the apparatus 1A straddles the mountain portions of the roof 100.

The rail R is a member which is detachably mounted on the upper portion of the roof 100 and guides the lateral movement of the surface processing apparatus 1A.

The rail R is formed in a rectangular frame shape by, for example, joining a pair of parallelly arranged guide members at both ends.

Since the rail R itself is relatively light in weight, it is possible for an operator to manually set the rail R straddling over multiple top surfaces 110 of the roof.

The rail R is arranged so that the guide member is orthogonal to the extending direction of the mountain portions and the valley portions of the folded-plate roof.

The lateral feeding wheels 80 are rolling elements which run on the guide member of the rail R during lateral feeding of the surface treatment device 1A.

Lateral feeding wheels 80 are provided at the lower end of the bracket projecting below the body of the carriage 10.

The lateral feeding wheels 80 are mounted to the carriage 10 so as to be relatively displaceable in the vertical direction.

The jack 90 is a driving device (moving body separating portion) which displaces the lateral feeding wheels 80 in the vertical direction relative to the carriage 10.

The jack 90 has a function of raising the carriage 10 relative to the rail R laid at the lower side of the feeding wheels 80 and projecting the feeding wheels 80 downward from the carriage 10.

For example, the jack 90 may be configured to be raised and lowered by an electric, hydraulic, or other actuator.

Figure 9:
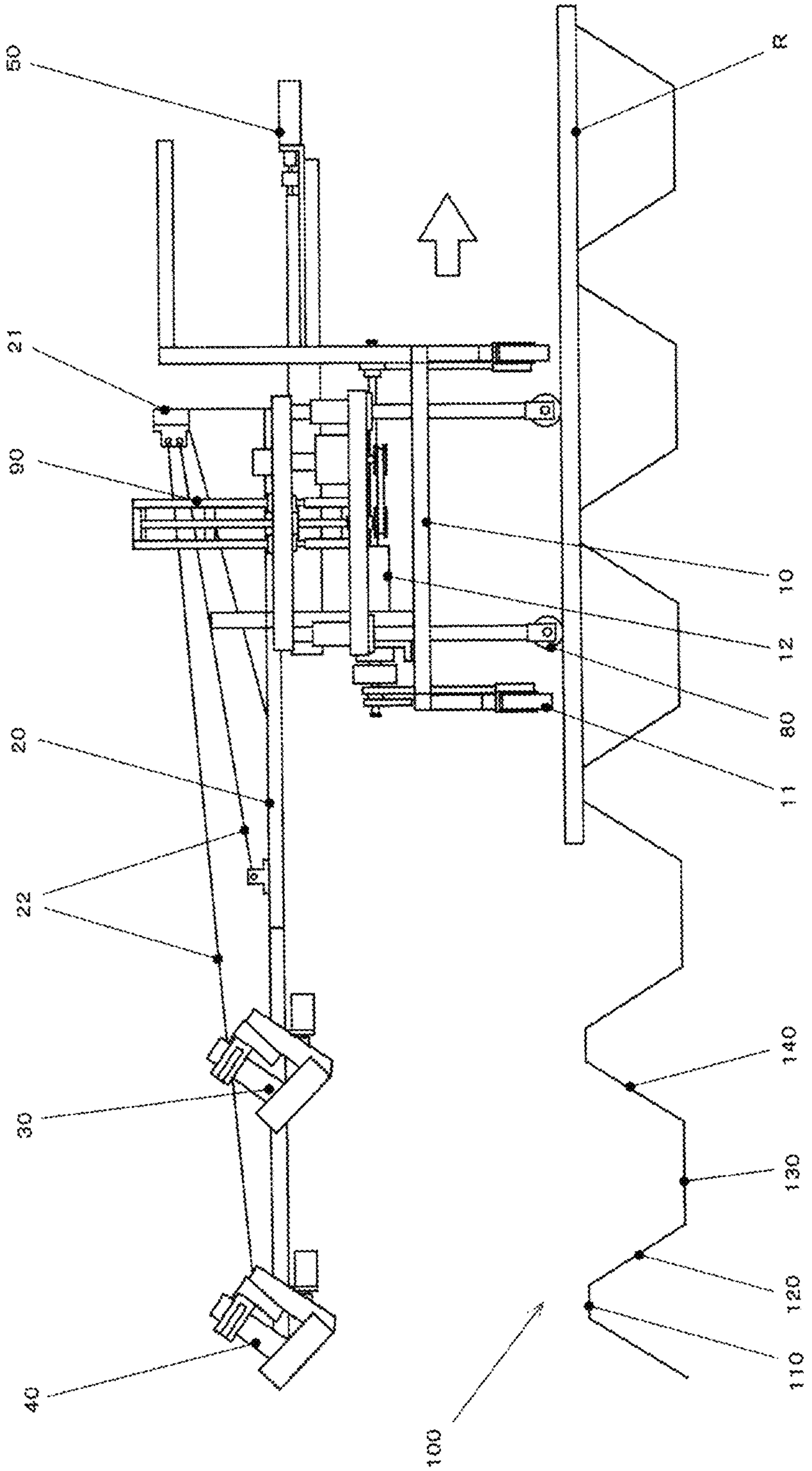
FIG. 9 A view showing a state in which a carriage is raised by a jack in the surface processing apparatus of the second embodiment.

FIG. 9 is a view showing a state in which the carriage is lifted by the jack in the surface processing apparatus according to the second embodiment.

In the state shown in FIG. 9, the wheels 11 of the carriage 10 have risen to a state higher than the top surface 110 of the roof 100, and the carriage 10 can move along the rail R to a direction straddling across a mountain portion and a valley portion of the roof 100. After the movement of the carriage 10 in the lateral direction is completed, by the jack 90, the lateral feeding wheels 80 has been raised relative to the carriage 10 (the carriage 10 is lowered relative to the roof 100), until the wheels 11 contact the bottom surface 130 of the roof 100 and the lateral feeding wheels 80 to apart from the rail R. Thereafter, the rail R can be moved, for example, manually by an operator.

According to the second embodiment described above, in addition to the effects similar to those of the first embodiment described earlier, it is possible to perform easily and in labor saving manner the movement to the direction straddling across a mountain portion and a valley portion of the roof 100 with a light and simple configuration.

A Third Embodiment

Next, a third embodiment of the surface processing apparatus to which the present invention is applied will be described.

In the surface processing apparatus of the third embodiment, which is not illustrated, a foaming agent spray device 30 and a coating agent spray device 40 are arranged along the travelling direction of the carriage 10 (the longitudinal direction of the mountain portion and the valley portion of the roof 100).

In the surface processing apparatus 1 according to the third embodiment, at first, the carriage 10 travels one stroke along the mountain portion and the valley portion in a state in which a foaming agent is sprayed from the foaming agent spray device 30.

Then, the carriage 10 travels one stroke or plural strokes along the same tracks in a state in which a coating agent is sprayed from the coating agent spray device 40. By this procedure, a heat-insulating foam layer and a reinforcing waterproof layer is sequentially performed.

According to the third embodiment described above, the configuration of the surface processing apparatus is made compact, and portability of the apparatus can be improved.

A Fourth Embodiment

Next, a fourth embodiment of the surface processing apparatus to which the present invention is applied will be described.

In the surface processing apparatus of a fourth embodiment that is not illustrated, in place of the foaming agent spray device 30 and the coating agent spray device 40 having the variable direction nozzle in the first embodiment, there are provided a foaming agent spray device 30 and a coating agent spray device 40 having a plurality of nozzles respectively directing to the 1st slope 120 and the 2nd slope 140 of the roof 100. According to the fourth embodiment described above, although the structure of the device for supplying the material to be sprayed becomes complicated, it is possible to reduce the movable portions of the apparatus and to improve durability and reliability.

(Modification)

The present invention is not limited to the embodiments described above, and various modifications and changes may be made without departing from the scope of the present invention.

(1) The configuration of the surface processing apparatus and the surface processing method is not limited to the above-described embodiments, and can be changed appropriately.

(2) In each of the embodiments, a set of the foaming agent spray device and the coating agent spray device is mounted on one surface treatment device, but a plurality of foaming agent spray devices and a plurality of coating agent spray devices may be provided in one surface treatment device.

It is also possible to provide a spray device which sprays other materials which further covers the reinforcing waterproof layer comprising a coating agent.

(3) The structure of the moving device for moving the surface processing apparatus in the direction straddling across a mountain portion and a valley portion is not limited to the configuration of the second embodiment, and can be changed as appropriate.

(4) In each of the embodiments, the object to be subjected to the surface treatment is a folded-plate roof as an example, however, the present invention is not limited thereto, and may be applied to surface treatment of other objects such as a slate roof other than a folded-plate roof and a wall surface of a building.

(5) In each of the embodiments, the roof 100 of the processed object has a structure in which the top surface 110, the 1st slope 120, the bottom surface 130, and the 2nd slope 140 extend along a direction in which the inclination is maximum, however, they are not necessarily extending along a maximum inclination. In this case, the surface processing apparatus 1 may be moved along any inclination direction of the roof and need not be moved along a direction in which the inclination is maximum.

EXPLANATION OF REFERENCE NUMERALS
[Explanation of letters or numerals]

| | | | |
|---|---|---|---|
| 1, 1A | surface processing apparatus | 10 | carriage |
| 11 | wheel | 12 | driving motor unit |
| 20 | nozzle stay | 21 | bracket |
| 22 | tension wire | 30 | foaming agent spray device |
| 40 | coating agent spray device | 50 | nozzle driving device |
| 60 | duct | 70 | cover frame |
| 80 | lateral feeding wheel | 90 | jack |
| R | rail | | |
| 100 | roof | 110 | top surface |
| 120 | 1st slope | 130 | bottom surface |
| 140 | 2nd slope | | |
| Sf | foaming agent spray | Sc | coating agent spray |
| F | insulation foam layer | C | reinforced waterproof layer |

The invention claimed is:

1. A surface processing apparatus comprising:

a moving body movable along a surface of a process object;

a first spray device provided on the moving body that sprays a first material having foaming properties on the surface of the process object, the first spray device comprising a first nozzle;

a second spray device provided on the moving body that sprays a second material configured to coat a surface of the first material on an area where the first material is already sprayed from the first spray device on the surface of the process object, the second spray device comprising a second nozzle; and a nozzle drive device that moves the first spray device and the second spray device relative to the moving body along a direction different from a direction of travelling of the moving body during a time when at least one of the first spray device and the second spray device performs spraying, wherein a point of contact with the moving body on the surface, a directed point of a nozzle axis of the first spray device, and a directed point of a nozzle axis of the second spray device are separately disposed in relation to each other and sequentially disposed in the direction different from the direction of travelling of the moving body during the time when at least one of the first spray device and the second spray device performs spraying, wherein, at the same time as the spray of the first material by the first spray device, the second material is sprayed by the second spray device, and wherein a center of oscillation of the first nozzle of the first spray device and a center of oscillation of the second nozzle of the second spray device are positioned apart from each other in the direction different from the direction of travelling of the moving body during the time when at least one of the first spray device and the second spray device performs spraying.

2. The surface processing apparatus according to claim 1, wherein the process object is a roof inclined with respect to a horizontal plane, and wherein the first spray device and the second spray device perform a spray in a state in which the moving body moves along an inclination direction of the roof.

3. The surface processing apparatus according to claim 1, wherein the process object is a roof inclined with respect to a horizontal plane, the roof having mountain portions protruding upward and extending along one direction and valley portions which are concave portions sandwiched between the mountain portions alternately arranged in parallel, and wherein the first spray device and the second spray device perform a spray in a state in which the moving body travels along a longitudinal direction of the mountain portion and the valley portion of the roof.

4. The surface processing apparatus according to claim 3, wherein the moving body has a rolling element running along the valley portion of the roof.

5. The surface processing apparatus according to claim 3, wherein the roof has a slope portion which is provided at a boundary portion between the mountain portion and the valley portion and which is inclined with respect to a projecting end surface of the mountain portion and a bottom surface of the valley portion respectively, and wherein the nozzle axis of at least one of the first spray device and the second spray device is arranged to be directed toward the slope portion.

6. The surface processing apparatus according to claim 5, wherein at least one of the first spray device and the second spray device is configured so that the nozzle axis is movable between a first state in which the nozzle axis is directed to the slope portion adjacent to one side of the valley portion and a second state in which the nozzle axis is directed to the slope portion adjacent to the other side of the valley portion.

7. The surface processing apparatus according to claim 1, wherein the moving body is movable along the surface in the direction different from the direction of travelling of the moving body at a time when at least one of the first spray device and the second spray device performs a spray.

8. The surface processing apparatus according to claim 1, further comprising:

a rail portion contacting with the surface to guide the moving body along the surface toward the direction different from the travelling direction at the time when at least one of the first spray device and the second spray device sprays, and a moving body separating portion provided between the moving body and the rail portion to alter a space between the moving body and the rail portion toward a direction to which the moving body is apart from the surface.

9. The surface processing apparatus according to claim 1, wherein the second spray device has a function of spraying the second material multiple times on an area where the first material has been sprayed by the first spray device.

10. The surface processing apparatus according to claim 1, wherein the moving body contacts the surface on only one direction side in a direction orthogonal to the travelling direction of the moving body at the time when the spray is performed toward an area where the first spray device and the second spray device spray the first material and the second material onto the surface.

11. A surface processing method comprising:

providing the surface processing apparatus according to claim 1;

spraying a first material having foaming property onto a surface of a process object using the first spray device provided on the moving body movable along the surface of the process object in the state in which the moving body is being moved; and spraying a second material configured to coat an area after the first material is sprayed on the surface of the object, using the second spray device provided on the moving body in the state in which the moving body is being moved.

12. The surface processing method according to claim 11, wherein the process object is a roof inclined with respect to a horizontal plane, and wherein the first spray device and the second spray device perform a spray in a state where the moving body moves along the inclination direction of the roof.

13. The surface processing method according to claim 11, wherein the process object is a roof inclined with respect to a horizontal plane, the roof having mountain portions protruding upward and extending along one direction and valley portions which are concave portions sandwiched between the mountain portions alternately arranged in parallel, and wherein the first spray device and the second spray device perform a spray in a state in which the moving body moves along a longitudinal direction of the mountain portion and the valley portion of the roof.

14. The surface processing method according to claim 13, wherein the moving body has a rolling element which runs along the valley portion of the roof.

15. The surface processing method according to claim 13, wherein the roof has a slope portion which is provided at a boundary portion between the mountain portion and the valley portion and which is inclined with respect to a projecting end surface of the mountain portion and a bottom surface of the valley portion respectively, wherein the nozzle axis of at least one of the first spray device and the second spray device is arranged to be directed toward the slope portion.

16. The surface processing method according to claim 15, wherein at least one of said first spray device and said second spray device is arranged so that the nozzle axis is changed between a first state in which the nozzle axis is directed to the slope portion adjacent to one side of the valley portion and a second state in which the nozzle axis is directed to the slope portion adjacent to the other side of the valley portion, and spray is respectively performed at the time of the first state and the second state in a state in which the moving body is being moved.

17. The surface processing method according to claim 11, wherein at least one of the first spray device and the second spray device performs a spray while the moving body moves along a first direction, and at an end portion of the first movement direction the moving body is moved in a second direction different from the first movement direction.

18. The surface processing method according to claim 17, wherein providing a rail portion for moving the moving body in contact with and along the surface, and in a direction different from the moving direction during a time when at least one of the first spray device and the second spray device sprays, and the moving body is moved in a direction along the rail portion in a state in which a distance between the moving body and the rail portion is altered to a direction in which the moving body is apart from the surface.

19. The surface processing method according to claim 11, wherein the second spray device sprays the second material multiple times onto the area where the first material is sprayed by the first spray device.

20. The surface processing method according to claim 11, wherein the moving body contacts the surface at only one direction side in a direction orthogonal to a moving direction of the moving body at the time when the spray is performed toward an area to which the first spray device and the second spray device spray the first material and the second material onto the surface, and spraying of the first material and the second material is performed while moving the moving body sequentially to the one direction side.

* * * * *